United States Patent [19]

Manzoni

[11] Patent Number: 4,577,823

[45] Date of Patent: Mar. 25, 1986

[54] DEVICE FOR REMOTELY CONTROLLING A REARVIEW MIRROR

[76] Inventor: Stéphane Manzoni, 1, rue Pasteur, 29200 Saint-Claude, France

[21] Appl. No.: 630,780

[22] Filed: Jul. 13, 1984

[30] Foreign Application Priority Data

Jul. 13, 1983 [FR] France .................. 83 11758

[51] Int. Cl.⁴ .................. B60R 1/06
[52] U.S. Cl. .................. 248/487; 248/485; 248/284; 248/291
[58] Field of Search .......... 248/479, 486, 487, 284, 248/291, 477, 278, 475.1, 485

[56] References Cited

U.S. PATENT DOCUMENTS

| Re. 27,172 | 9/1971 | Van Noord | 248/487 X |
| 2,504,387 | 4/1950 | Pruellage | 248/487 |
| 2,684,798 | 7/1954 | Schweiter et al. | 248/284 |
| 3,628,862 | 12/1971 | Stephenson | 248/487 X |
| 4,286,841 | 9/1981 | Deshaw | 248/487 X |
| 4,444,466 | 4/1984 | Deshaw | 248/487 |

Primary Examiner—Ramon S. Britts
Assistant Examiner—Karen Chotkowski
Attorney, Agent, or Firm—Remy J. VanOphem

[57] ABSTRACT

A device for controlling an outside rearview mirror from inside a vehicle. A support member for the rearview mirror is mounted to pivot about a first axis Y-Y1. On the rear face of the mirror support member, two parallel arms engage a cylinder boss affixed on a shaft. The shaft is mounted to rotate and to slide in bearings made in the spider. The cylindrical boss and shaft are directed by a rotatable control cable and adapted to move both rotatably and axially. The cylindrical boss travels along on a semi-cylindrical guide means along the arc of a circle about a second.

8 Claims, 12 Drawing Figures

DEVICE FOR REMOTELY CONTROLLING A REARVIEW MIRROR

BACKGROUND OF THE INVENTION

1. Field of the Invention

The present invention relates to a device for controlling an outside rearview mirror from inside a vehicle.

2. Description of the Prior Art

Remotely controlled rearview mirrors in which the mirror is mounted to pivot via a ball joint or two perpendicular pins mounted on a casing affixed to the vehicle are well known in the art.

Use of a direct action control cable to control the left-right and up-and-down movements of the rearview mirror is also known in the art. The control cable may be slidingly moved axially or rotated in order to obtain either an up-and-down or left-right movement of the rearview mirror. The movement transforming means of the devices known in the art have heretofore not been entirely satisfactory.

SUMMARY OF THE INVENTION

A principal object of the present invention is to provide an improved control device.

Another object of this invention is to provide a device which presents direct and precise adjustment of the mirror and which may be actuated easily.

A further object of this invention is to provide a device in which molded parts are used so that the device may be clipped together for easy assembly.

According to the invention, a pair of parallel arms are positioned on the rear face of the support member for the mirror. A cylindrical boss is affixed on a shaft mounted to rotate in bearings positioned in a spider located between the pair of parallel arms. The shaft is connected to a rotatable control cable and adapted to move axially. The spider is connected to a guide assembly by a cylindrical boss. The cylindrical boss thereby moves along an arc of a circle about an axis.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENT

Figure 3:
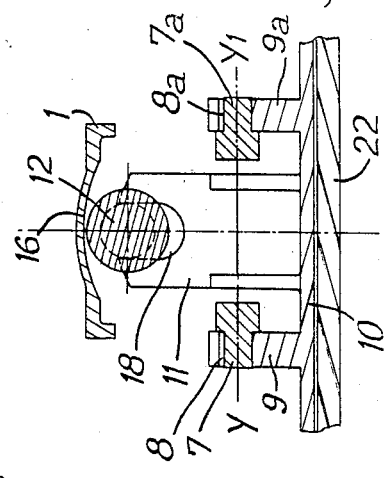
FIG. 3 is a sectional view along line III—III of FIG. 1.

Referring now to the drawings, FIGS. 1, 2, 3 and 3a show an embodiment of a device for controlling a rearview mirror 22 actuated by a control cable rotatable in the directions of the double arrow A1–A2 and axially movable in the directions of the double arrow B1–B2.

A base 1 is provided with mounting tabs 2 and 2a. Holes shown at 3 and 3a are provided in the mounting tabs 2 and 2a for engaging fasteners to assemble the base 1 to the bottom of a casing (not shown in the drawings).

From a front face of the base 1, a pair of lateral walls, 1a and 1b extend perpendicularly thereto. Each lateral wall has a respective bearing 4 and 4a in which is pivotally mounted a cylindrical lug 5 and 5a positioned on two side pieces 6a and 6b of a spider 6. The spider pivots about the base on a horizontal axis X–X1.

Along a vertical axis Y–Y1, perpendicular to the horizontal axis X–X1, two cylindrical lugs 7 and 7a are mounted on the spider 6 to pivot in two bearings 8 and 8a made respectively in two coupling tabs 9 and 9a. The two coupling tabs 9 and 9a are provided on the rear face 28 of a support member 10 for the rearview mirror 22.

This arrangement makes it possible to mount the mirror 22 to the base 1 so that the rearview mirror can move about the horizontal axis X–X1 and the vertical axis Y–Y1.

Figure 6:
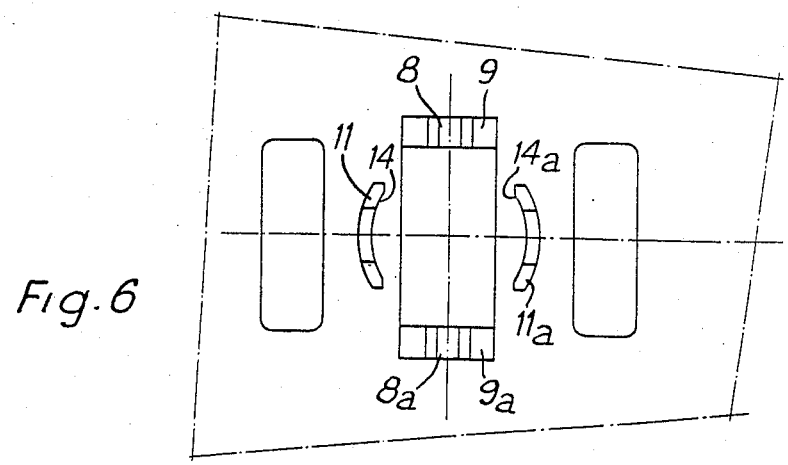
FIG. 6 is an elevational view of the mirror support member in the direction of arrow F1 of FIG. 4.
Figure 7:
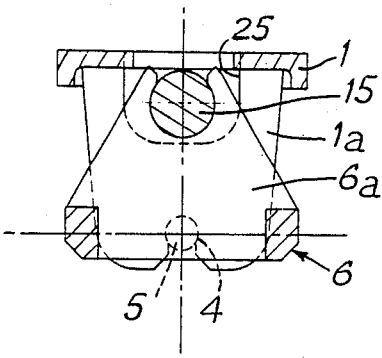
FIG. 7 is a sectional view along line VII—VII of FIG. 4.
Figure 7A:
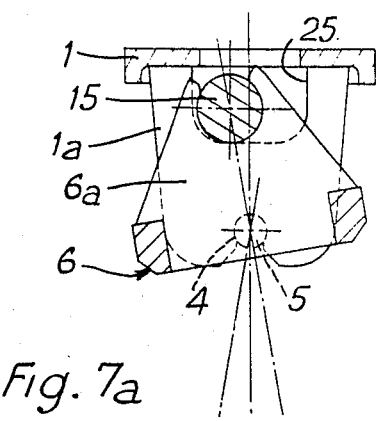
FIG. 7a is a partial sectional view along lines VII—VII of FIG. 4 showing an alternative position of the device.
Figure 8:
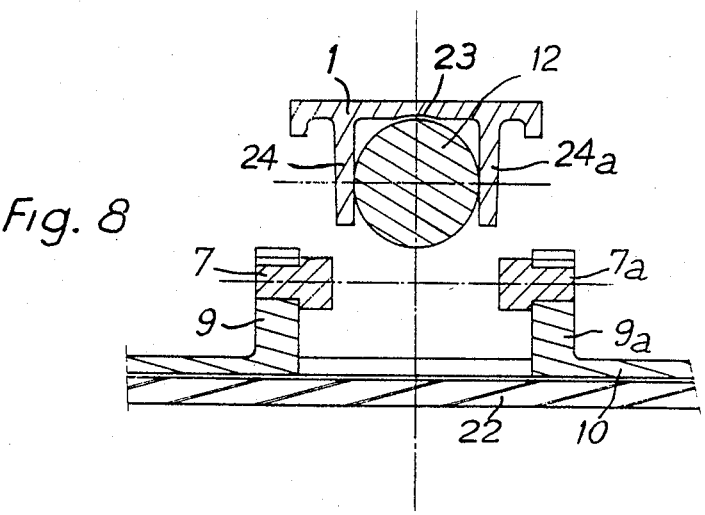
FIG. 8 is a sectional view along line VIII—VIII of FIG. 4.
Figure 9:
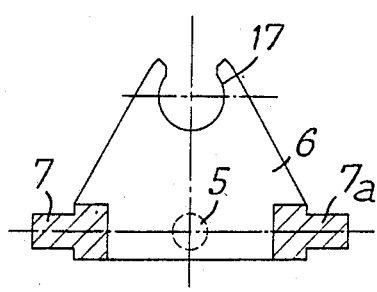
FIG. 9 is a view of the spider partially in cross-section.
Figure 10:
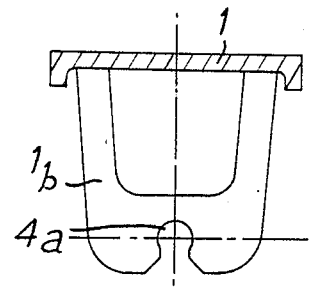
FIG. 10 is a view of the base partially in cross-section.

On the rear face 28 of the support member 10 are provided two parallel arms 11 and 11a. The two parallel arms 11 and 11a engage a cylindrical boss 12 which has at its two extreme ends two hemispherical portions 13 and 13a in contact with two respective semi-cylindrical surfaces 14 and 14a provided on the two parallel arms 11 and 11a, as shown in FIG. 6. The cylindrical boss 12 is affixed on a shaft 27 which has a free end 15 and a second end 15a. The axis of the shaft 27 is parallel to the horizontal axis X–X1, and coaxial to the axis of the cylindrical boss 12. The cylindrical boss 12 is held in contact with a semi-cylindrical surface 16 on the front face of the base 1.

The free end 15 and second end 15a of the shaft 27 are mounted to rotate and to slide axially in the bearings 17 and 17a located in the side pieces 6a and 6b of the spider 6, and the two parallel arms 11 and 11a respectively present notches 18 and 18a which engage the free end 15 and second end 15a of the shaft 27 fixed with the cylindrical boss 12.

The second end 15a of the shaft 27 is affixed to a control cable 19 rotatable in the directions of the double A1–A2 and transversely movable in the directions of the double arrow B1–B2.

Figure 2:
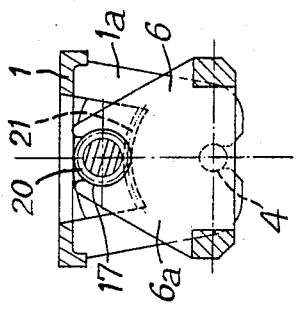
FIG. 2 is a partial cross-sectional view along line II—II of FIG. 1.
Figure 3A:
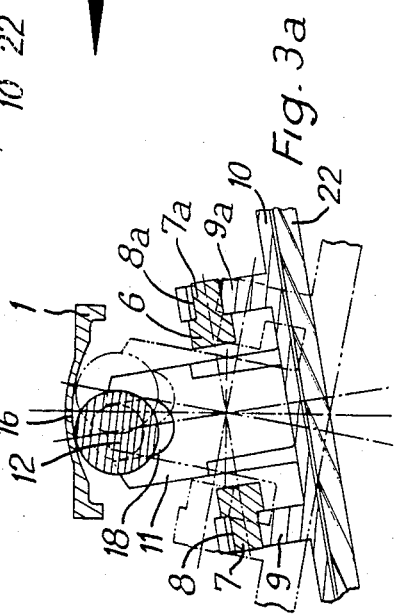
FIG. 3a is a view along line III—III of FIG. 1 which shows another position of the device.

The free end 15 of the shaft 27 has located thereon a pinion 20 which meshes with a toothed sector 21 shown in FIG. 2 formed in an aperture located in one of the lateral walls 1a of the base 1.

The control device shown in FIGS. 1, 2 and 3 operates as follows:

When a push or a pull is exerted on the control cable 19, the control cable moves in the direction of the double arrow B1–B2 and moves the cylindrical boss 12, guided by the free end 15 and second end 15a of the shaft 27 which slide in the bearings 17 and 17a of the spider 6 in a direction parallel to the axis X-X1.

Figure 1:
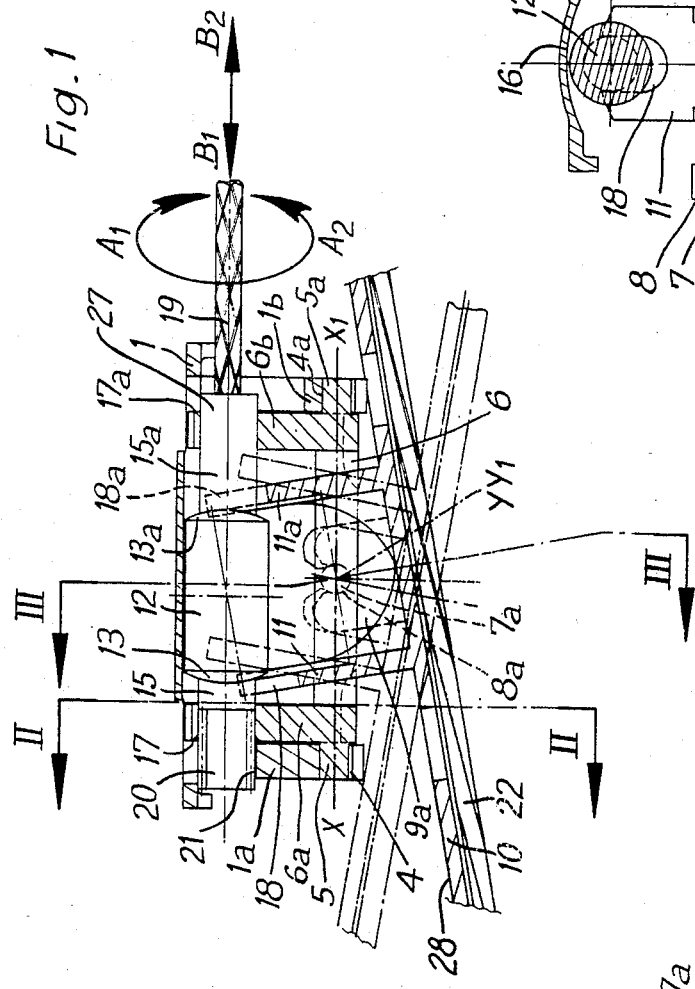
FIG. 1 is a partial cross-sectional view of an embodiment of the device for remotely controlling a rearview mirror in accordance with the invention.

The longitudinal displacement of the cylindrical boss 12 which is captured between the two parallel arms 11 and 11a causes displacement of the support member 10 about the lugs 7 and 7a of the spider 6 and consequently about the vertical axis Y-Y1, resulting in a counterclockwise movement of the mirror 22, as viewed in FIG. 1.

When the control cable 19 is rotated in the directions of the double arrow A1-A2, the shaft 27, the cylindrical boss 12 and the pinion 20 affixed to the shaft 27 are rotated in unison. The pinion 20 meshes with the toothed sector 21 in the lateral wall 1a of the base 1 and causes the spider 6 to pivot by its lugs 5 and 5a in the bearings 4 and 4a and consequently pivots the rearview mirror 22 about the horizontal axis X-X1.

This pivoting allows an up-and-down movement of the mirror directed by a rotation of the control cable 19 in the directions of the arrows A1-A2, as shown in FIG. 1.

FIGS. 4 to 8 show another embodiment of the control device in accordance with the invention in which the cylindrical boss 12 is an eccentric with respect to the free end 15 and the second end 15a of the shaft 27 to which it is affixed.

Figure 5:
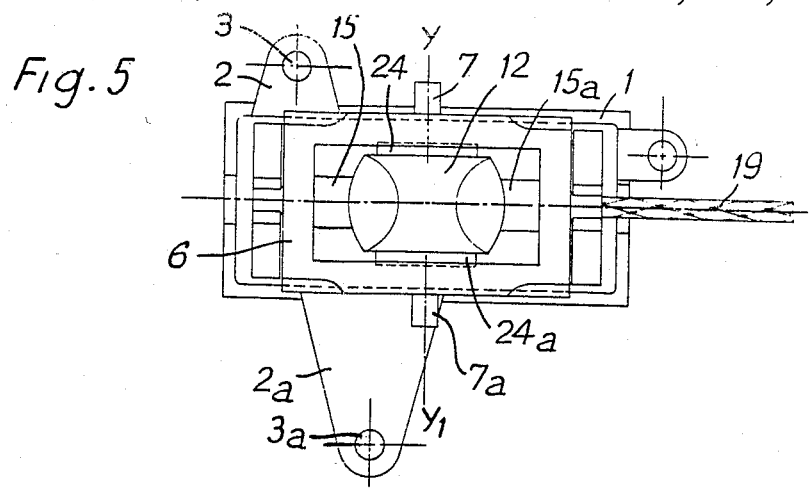
FIG. 5 is an elevational view of the device without the mirror support member in the direction of the arrow F2 of FIG. 4.

Furthermore, the cylindrical boss 12 which is abutted against a support surface 23 of the base 1 is positioned by two parallel flanges 24 and 24a, shown in FIG. 5. The parallel flanges 24 and 24a extend perpendicularly to the support surface 23 of the base 1 on either side of the cylindrical boss 12.

This results in the elimination of the pinion 20 and the toothed sector 21 of the former embodiment. The free end 15 of the shaft 27 which is fixed to the cylindrical boss 12 engages an oblong slot 25 made in one of the pair of lateral walls 1a of the base 1.

Figure 4:
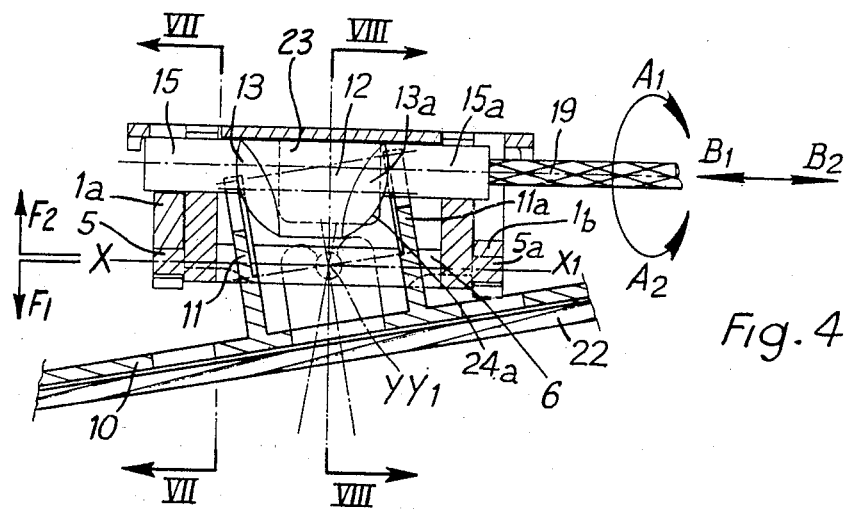
FIG. 4 is a partial cross-sectional view of another embodiment of the device for remotely controlling a rearview mirror in accordance with the invention.

When a push or a pull is exerted on the control cable 19 in the direction of the double arrow B1-B2, the cylindrical boss 12 is acted upon as described in the former embodiment and moves transversely to rotate the mirror support 10 about the vertical axis Y-Y1, resulting in a counterclockwise movement of the rearview mirror 22, as viewed in FIG. 4.

When the control cable 19 is rotated in the directions of the double arrow A1-A2, the shaft 27 and consequently the cylindrical boss 12 which is positioned between the flanges 24 and 24a of the base 1 are rotated about the horizontal axis X-X1.

The free end 15 and second end 15a of the shaft 27 are eccentric with respect to the axis of the cylindrical boss 12, resulting in an angular displacement of the free end 15 and the second end 15a of the shaft 27 and in the spider 6 being driven by its lugs 5 and 5a about the horizontal axis X-X1.

The rearview mirror 22, being connected to the spider 6, moves in an up-and-down movement.

The invention is not limited to the embodiments set forth above and those skilled in the art may make modifications thereto without departing from the scope of the invention.

What I claim is as follows:

1. A control device for positioning a rearview mirror, said control device comprising:
   a support member having a front face and a rear face, said rearview mirror being attached to said front face, said support member further having two coupling tabs extending outwardly from said rear face;
   a pair of arms affixed to said rear face of said support member, said pair of arms extending outwardly from said rear face;
   a spider having two cylindrical lugs defining a first axis of rotation, said two coupling tabs of said support member being mounted to pivot about said first axis, said spider further having two additional cylindrical lugs defining a second axis of rotation substantially located in a plane normal to said first axis of rotation;
   a base attached to said two additional cylindrical lugs defining said second axis of rotation, said spider being mounted to said base to pivot about said second axis of rotation;
   a shaft rotatably and slidably mounted to said base, said shaft having a free end engaging said spider, a second end rotatably mounted to said spider, and an enlarged center portion between said free end and said second end adapted to engage said base, said pair of arms affixed to said rear face of said support member further communicating with said free end and said second end, respectively, of said shaft such that axial movement of said shaft rotates said support member about said first axis; and
   means for rotating said support member about said second axis of rotation such that said support member rotates about said first and said second axis of rotation to provide positioning of said rearview mirror.

2. The control device as claimed in claim 1, wherein said means for rotating said support member about said second axis of rotation further comprises:
   a pair of lateral walls affixed to said base, said pair of lateral walls extending outwardly from said base, each of said pair of lateral walls having an oblong slot therein;
   a toothed sector positioned in said oblong slot of at least one of said pair of lateral walls; and
   a pinion affixed to one of said free end and said second end of said shaft, said pinion adapted to engage said toothed sector for movement relative thereto.

3. The control device as claimed in claim 1, wherein each of said two coupling tabs of said support member has a notch adapted to engage said two cylindrical lugs defining said first axis of rotation.

4. The control device as claimed in claim 1, wherein said center portion of said shaft is a cylindrical boss having two hemispherical ends, said two hemispherical ends communicating with said pair of arms of said support member to rotate said support member about said first axis of rotation.

5. The control device as claimed in claim 4, wherein each of said pair of arms has a semi-cylindrical portion in contact with a respective one of said two hemispherical ends of said cylindrical boss.

6. A control device for positioning a rearview mirror, said control device comprising:
   a support member having a front face and a rear face, said rearview mirror being attached to said front face;
   a pair of arms affixed to said rear face of said support member, said pair of arms extending outwardly from said rear face, said support member further having two coupling tabs extending outwardly from said rear face;
   a spider having two cylindrical lugs defining a first axis of rotation, said two coupling tabs of said support member being mounted to pivot about said first axis, said spider further having two additional cylindrical lugs defining a second axis of rotation substantially located in a plane normal to said first axis of rotation;

a base attached to said two additional cylindrical lugs defining said second axis of rotation, said spider being mounted to said base to pivot about said second axis of rotation;

a shaft rotatably and slidably mounted to said base, said shaft having a free end engaging said spider, a second end rotatably mounted to said spider and an enlarged center portion between said free end and said second end adapted to engage said base, said pair of arms affixed to said rear face of said support member further communicating with said free end and said second end, respectively, of said shaft such that axial movement of said shaft rotates said support member about said first axis;

a pair of lateral walls perpendicularly extending from said base, said pair of lateral walls rotatably and slidably supporting said shaft, said enlarged center portion of said shaft further being eccentric with respect to said free end and said second end, whereby rotation of said shaft angularly displaces said spider and said support member about said second axis of rotation; and means for axially and rotatably moving said shaft thereby selectively controlling displacement of said support member about said first and second axis of rotation.

7. The device as claimed in claim 6, wherein each of said pair of lateral walls extending perpendicularly from said base, further comprises an oblong slot for engaging said shaft.

8. A control device for positioning a rearview mirror, said control device comprising:

a base member having a bottom portion and a pair of lateral walls extending perpendicularly from said bottom portion;

a shaft rotatably and slidably mounted to said base member;

a spider member having two cylindrical lugs defining a first axis of rotation and two additional cylindrical lugs defining a second axis of rotation, said first axis of rotation being substantially perpendicular to said second axis of rotation, said two additional cylindrical lugs further being mounted to said pair of lateral walls extending from said bottom portion of said base member;

a support member having two coupling tabs mounted to said two cylindrical lugs of said spider member, such that said support member pivots about said first axis of rotation;

a pair of arms affixed to said support member, said pair of arms extending outwardly of said support member in a direction towards said shaft such as to cooperate therewith; and means for rotating said support member about said first and said second axis of rotation, said means for rotating being mounted to said spider member and further communicating with said base member to rotate said spider member about said second axis of rotation, said means for rotating further communicating with said support member to rotate said support member about said first axis of rotation to provide positioning of said rearview mirror.

* * * * *

UNITED STATES PATENT AND TRADEMARK OFFICE
CERTIFICATE OF CORRECTION

PATENT NO. : 4,577,823
DATED : March 25, 1986
INVENTOR(S) : Stephane Manzoni

It is certified that error appears in the above-identified patent and that said Letters Patent is hereby corrected as shown below:

In The Abstract

Line 5, delete "cylinder" and insert ---- cylindrical ----.

Line 11, after "second" insert ---- axis X-X1 ----.

Signed and Sealed this

Fifth Day of August 1986

[SEAL]

Attest:

DONALD J. QUIGG

Attesting Officer

Commissioner of Patents and Trademarks